United States Patent [19]

Parker et al.

[11] Patent Number: 5,061,969

[45] Date of Patent: Oct. 29, 1991

[54] HYBRID DEVELOPMENT SCHEME FOR TRILEVEL XEROGRAPHY

[75] Inventors: Delmer G. Parker, Rochester; William M. Allen, Webster; Jerome E. May, Rochester, all of N.Y.

[73] Assignee: Xerox Corporation, Stamford, Conn.

[21] Appl. No.: 546,976

[22] Filed: Jul. 2, 1990

[51] Int. Cl.[5] .................... G03B 15/01; G03B 15/09

[52] U.S. Cl. .................... 355/328; 355/251; 430/45

[58] Field of Search .................... 355/202, 251, 326, 328; 430/45, 122

[56] References Cited

U.S. PATENT DOCUMENTS

| | | | |
|---|---|---|---|
| 4,078,929 | 3/1978 | Gundlach | 430/42 |
| 4,397,264 | 8/1983 | Hatch | 118/656 |
| 4,524,117 | 6/1985 | Maekawa et al. | 430/45 X |
| 4,539,281 | 9/1985 | Tanaka et al. | 430/45 |
| 4,868,611 | 9/1989 | Germain | 355/328 |
| 4,901,114 | 2/1990 | Parker et al. | 355/328 X |

*Primary Examiner*—Joan H. Pendegrass

[57] ABSTRACT

A hybrid development system for developing composite tri-level xerographic latent images in which conductive magnetic brush (CMB) development system is employed at the first development station and insulative magnetic brush (IMB) development system is used at the second station. In order to preclude spurious fringe field development by the IMB development system at the second development station the conductivity of the IMB developer is in the order of $10^{-13}$ to $10^{-15}$ ohm-cm. Additionally, a scorotron corona charging device located between the two development housings may be used to charge the image developed at the first station to the same potential as the background (white level) thereby eliminating spurious fringe field development by the IMB developer with a conductivity less than $10^{-13}$ ohm-cm at the second development station.

14 Claims, 3 Drawing Sheets

HYBRID DEVELOPMENT SCHEME FOR TRILEVEL XEROGRAPHY

BACKGROUND OF THE INVENTION

This invention relates generally to the rendering of latent electrostatic images visible using multiple colors of dry toner or developer and, more particularly, to a developer apparatus and method of suppressing the development of the fringe fields of complementary tri-level images.

The invention can be utilized in the art of xerography or in the printing arts. In the practice of conventional xerography, it is the general procedure to form electrostatic latent images on a xerographic surface by first uniformly charging a photoconductive insulating surface or photoreceptor. The charge is selectively dissipated in accordance with a pattern of activating radiation corresponding to original images. The selective dissipation of the charge leaves a latent charge pattern on the imaging surface corresponding to the areas not struck by radiation.

This charge pattern is made visible by developing it with toner. The toner is generally a colored powder, the powder having been given an electrostatic charge by some means, which adheres to the charge pattern by electrostatic attraction.

The developed image is then fixed to the imaging surface or is transferred to a receiving substrate such as plain paper to which it is fixed by suitable fusing techniques.

The concept of tri-level xerography is described in U.S. Pat. No. 4,078,929 issued in the name of Gundlach. The patent to Gundlach teaches the use of tri-level xerography as a means to achieve single-pass highlight color imaging. As disclosed therein, the charge pattern is developed with toner particles of first and second colors. The toner particles of one of the colors are positively charged and the toner particles of the other color are negatively charged. In one embodiment, the toner particles are supplied by a developer which comprises a mixture of triboelectrically relatively positive and relatively negative carrier beads. The carrier beads support, respectively, the relatively negative and relatively positive toner particles. Such a developer is generally supplied to the charge pattern by cascading it across the imaging surface supporting the charge pattern. In another embodiment, the toner particles are presented to the charge pattern by a pair of magnetic brushes. Each brush supplies a toner of one color and one charge. In yet another embodiment, the development system is biased to about the background voltage. Such biasing results in a developed image of improved color sharpness.

In tri-level xerography, the xerographic contrast on the charge retentive surface or photoreceptor is divided three, rather than two, ways as is the case in conventional xerography. The photoreceptor is charged, typically to 900 v. It is exposed imagewise, such that one image corresponding to charged image areas (which are subsequently developed by charged area development, i.e. CAD) stays at the full photoreceptor potential ($V_{ddp}$ or $V_{cad}$, see FIGS. 1*a* and 1*b*). The other image is exposed to discharge the photoreceptor to its residual potential, i.e. $V_c$ or $V_{dad}$ (typically 100 v) which corresponds to discharged area images that are subsequently developed by discharged-area development (DAD). The background areas exposed such as to reduce the photoreceptor potential to halfway between the $V_{cad}$ and $V_{dad}$ potentials, (typically 500 v) and is referred to as $V_w$ or $V_{white}$. The CAD developer is typically biased about 100 v closer to $V_{cad}$ than $V_{white}$ (about 600 v), and the DAD developer system is biased about 100 v closer to $V_{dad}$ than $V_{white}$ (about 400 v).

As discussed in U.S. Pat. No. 4,397,264 which relates to a conventional xerographic image development system, conductive magnetic brush (CMB) development and insulating magnetic brush (IMB) development systems suffer from limitations in their abilities to meet the full range of copy quality requirements. Specifically, insulating magnetic brush development systems have difficulty in using a single-developer roller to develop both fine lines and solid areas. In order to optimize solid area development with an insulating developer material, the spacing between the developer roller and photoconductive surface must be made quite small. However, low density fine line development occurs at a larger spacing to take advantage of fringe field development with insulating materials. Insulative developer materials allow development with higher cleaning fields than conductive developer systems so as to minimize background development.

As further discussed in the '264 patent, conductive magnetic brush development systems exhibit low sensitivity to low density lines. Conductive developer materials are relatively insensitive to fringe fields. In order to achieve low density fine line development with conductive developer materials, the cleaning field must be relatively low. This can produce-relatively high background.

The shortcomings of CMB and IMB development systems discussed above with respect to conventional xerography have, heretofore, been present in highlight color xerography as well. In fact, the problem of not being to able to develop low density fine lines with CMB developer in the presence of relatively high cleaning fields favors the use of IMB developer. However, in a tri-level highlight color system the use of IMB developer has been found to be unacceptable. Its use results in the development of fringe fields in a color different from the rest of the image. Thus, for example, in a tri-level system that uses black and red developers of the insulative type, the black images would have a red border around them while red images would have a black border around them.

The development of fringe fields occurs due to the longer range effect on toner particles of the electric field gradients associated with large potential differences at the edges of images. Fringe field development effects are suppressed by CMB development systems because the intrinsic conductivity of the CMB carrier enhances the electric field from charge near the center of the image to give approximately the same attractive force on a toner particle at the center of an image as at the edge. Insulative development systems show this effect weakly or not at all. (See Schaffert, "Electrophotography" (revised edition), Focal Press, 1975, pp. 34–37.)

U.S. Pat. No. 4,868,611 granted to Richard P. Germain on Sept. 19, 1989 relates to a highlight color imaging method and apparatus for forming a single polarity charge pattern having at least three different voltage levels on a charge retentive surface wherein two of the voltage levels correspond to two image areas and the third level corresponds to a background level. Interaction between conductive magnetic brush (CMB) developer materials contained in a developer housing and an already developed CMB image in one of the two image areas is minimized by the use of a scorotron to minimize the potential difference between the charge on an already developed image and the background potential.

BRIEF SUMMARY OF THE INVENTION

Insulative Magnetic Brush (IMB) (developer conductivity $<10^{-13}$ ohm-cm$)^{-1}$ developers, when used in either the first or second development station in the presence of a composite tri-level electrostatic image, have the undesirable trait of developing the fringe fields of the complementary image. This problem is more pronounced if the IMB developer is used in the first development station because the magnitude of the complementary image fringe field is greater than at the second development station.

For example, consider a system where black IMB developer is used in the first of two housings. Here, with an electrostatic image as shown in FIG. 1B, the fringe fields, due to the presence of the color complementary latent image as the tri-level image passes through the first development station, are approximately $|V_{bb}-V_{color}|$ whereas the black development field is $V_{ddP}-V_{bb}$. On the other hand, the magnitude of the fringe field, due to the complementary tri-level image at the second development station, are diminished by the amount of charge neutralization that occurs in the first development step. Charge neutralization for an IMB developer is typically less than 50%.

In the case of Conductive Magnetic Brush (CMB) development, this neutralization is nearly complete so that the potential of the developed black image (illustrated in FIG. 1B), as it emerges from the first development station, is relatively close to that of $V_{bb}$. Even so, the fringe fields at the second development station, $|V_{bb}-V_{cb}|$, may be large enough so that an IMB developer will develop fringe fields around the first image. Because CMB developers are relatively impervious to the complementary image and fringe fields, develop to completion (neutralization), and saturate at relatively low contrast potentials, they are preferred for tri-level xerography.

In accordance with the present invention, a hybrid development system for developing composite tri-level xerographic latent images without fringe field development is provided. Conductive magnetic brush (CMB) development is employed in the first of two development stations, and insulative magnetic brush (IMB) development at the second station.

At an imaging station (typically a laser raster scanner) creates a composite tri-level latent image on a uniformly charged photoreceptor in which the portions to be printed in color are the fully discharged. The portions to be printed in black are not discharged and remain at the dark decay voltage, $V_{ddp}$ and the white (background) areas are at an intermediate voltage, $V_{white}$. Discharged area development (DAD) with conductive brush (CMB) two component developer is used at the first development station to develop the colored parts of the latent image. The CMB developer is relatively impervious to the fringe fields associated with the complementary (in this case, black) latent image. In the process of developing the DAD image, the developer will raise the potential of the DAD image areas to within a few volts of the first development housing's bias potential, $V_{cb}$. Two component IMB developer having a conductivity in the order of $10^{-13}$ to $10^{-15}$ (ohm-cm$)^{-1}$ is used in the second housing in order to preclude fringe field development when the color image passes through the second development station.

One major advantage of using the CMB/IMB development arrangement just described is that the desirable edge enhancing characteristics of IMB developers, particularly with reference to half tone and fine line renditions, can be realized for the black images while retaining compatibility with single pass highlight color. For example, a high resolution (600 spot-per-inch) xerographic printer could be built to operate in the monochrome black mode using CAD/IMB developer without the need for pre-transfer corona charging. Single pass highlight color capability could then be provided in the same machine by enabling the DAD color housing and pre-transfer corona charging. In this case, the black information could still be written at 600 SPI while the color information could be written at a lower resolution (for example, 300 SPI) by using two scan lines per pixel redundancy in the color information.

It may also be advantageous to employ IMB developers in the second position if toners having specific characteristics, say, fluorescence or a magnetic property, cannot readily be formulated to work appropriately as a conductive developer materials.

Although we have described this invention proposal in the context of a DAD/CMB color developer at the first development station and a black CAD/IMB developer at the second developer station, any combination of color/black or DAD/CAD is possible as long as the CMB development precedes the IMB development.

Optionally, a scorotron corona charging device, located between the two development housings, may be used to charge the image developed at the first station to the same potential as the background (white level), thereby eliminating spurious fringe field development by the IMB developer at the second development station even when using insulative toner material with a conductivity less than $10^{-13}$ (ohm-cm$)^{-1}$.

DETAILED DESCRIPTION OF THE PREFERRED EMBODIMENT OF THE INVENTION

Figure 1A:
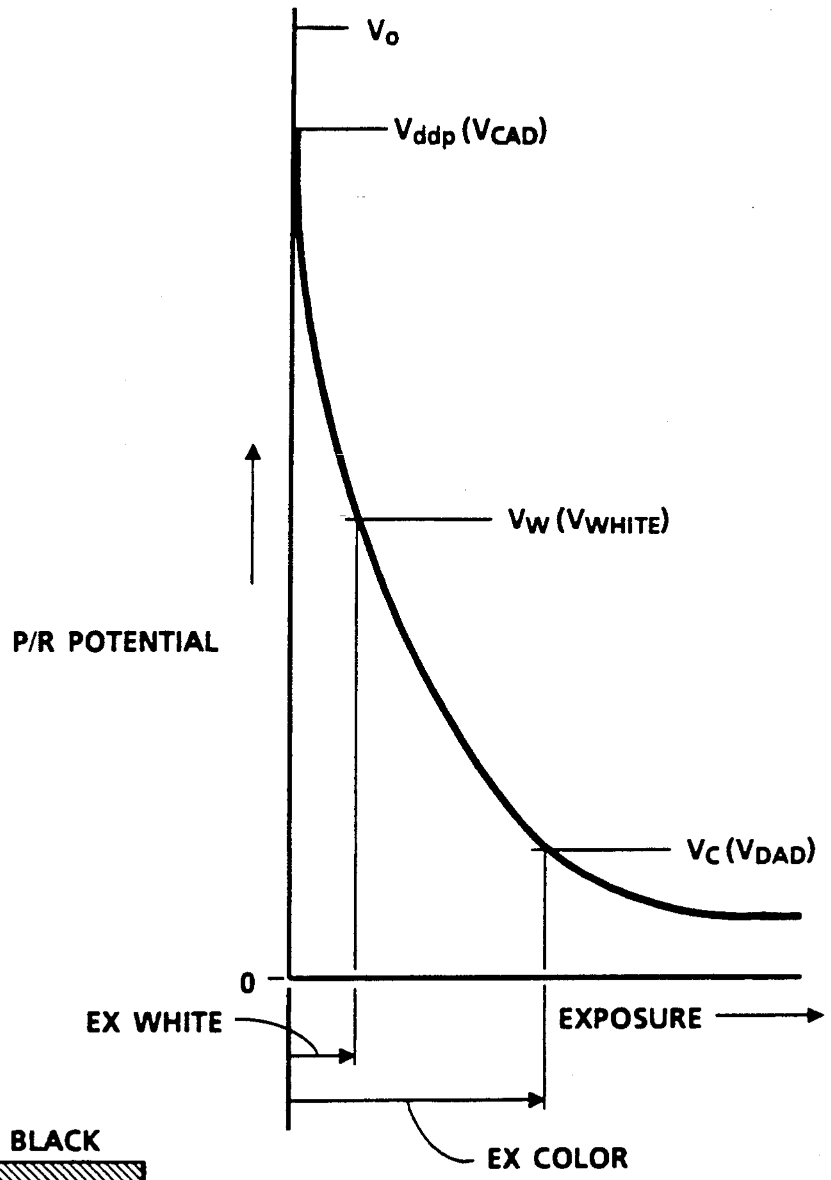
FIG. 1*a* is a plot of photoreceptor potential versus exposure illustrating a tri-level electrostatic latent image.
Figure 1B:
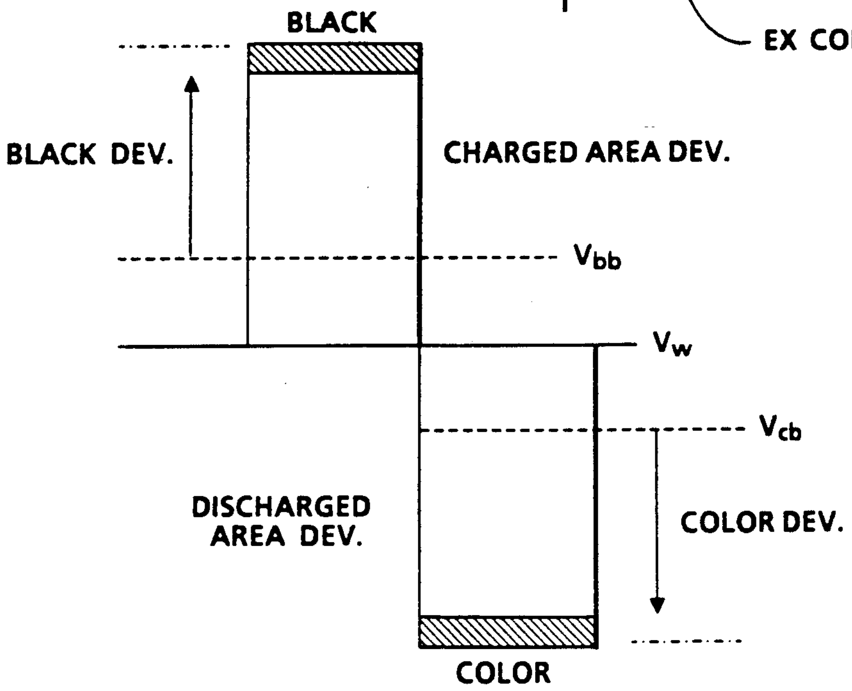
FIG. 1*b* is a plot of photoreceptor potential illustrating single-pass, highlight color latent image characteristics.

For a better understanding of the concept of tri-level imaging, a description thereof will now be made with reference to FIGS. 1*a* and 1*b*. FIG. 1*a* illustrates the tri-level electrostatic latent image in more detail. Here $V_O$ is the initial charge level, $V_{ddp}$ or $V_{CAD}$ the dark discharge potential (unexposed), $V_w$ the white discharge level and $V_c$ or $V_{DAD}$ the photoreceptor residual potential (full exposure).

The latent image is created by first charging the photoreceptor (p/r) to some initial charge level ($V_o$), and then exposing the p/r which, by virtue of the dark decay phenomenon discharges to $V_{ddp}$, to three discrete voltage levels using a Raster Output Scanner (ROS). The two voltages that represent the document information (both colors) are commonly referred to as the Charged Area Development potential ($V_{CAD}$) and the Discharged Area Development potential ($V_{DAD}$). The third voltage represents the white or background potential ($V_{WHITE}$), and corresponds to the background areas or those areas of the document that are to be white. $V_{CAD}$ is generated when the ROS output is minimum (off), and is roughly equal to $V_O$. $V_{DAD}$, on the other hand, is generated when the ROS output is maximum (on full), and is typically equal to the residual potential of the p/r (<100 v). $V_{WHITE}$ is generated when the ROS output is approximately at half power, and is typically equal to $V_{CAD}/2$.

Color discrimination in the development of the electrostatic latent image is achieved by passing the photoreceptor past two developer housings in tandem which housings are electrically biased to voltages which are offset from the background voltage $V_w$, the direction of offset depending on the polarity or sign of toner in the housing. The first housing contains developer with CMB color toner having triboelectric properties such that the toner is driven to the parts of the latent image at residual potential, $V_{DAD}$ by the electric field between the photoreceptor and the development rolls biased at $V_{cb}$ ($V_{color\ bias}$) as shown in FIG. 1*b*. Conversely, the triboelectric charge on the black toner in the second housing is chosen so that the toner is urged towards parts of the latent image which are the most highly charged ($V_{CAD}$) areas of the latent image by the electric field existing between the photoreceptor and the development rolls in the second housing at bias voltage $V_{bb}$ ($V_{black\ bias}$).

Figure 2:
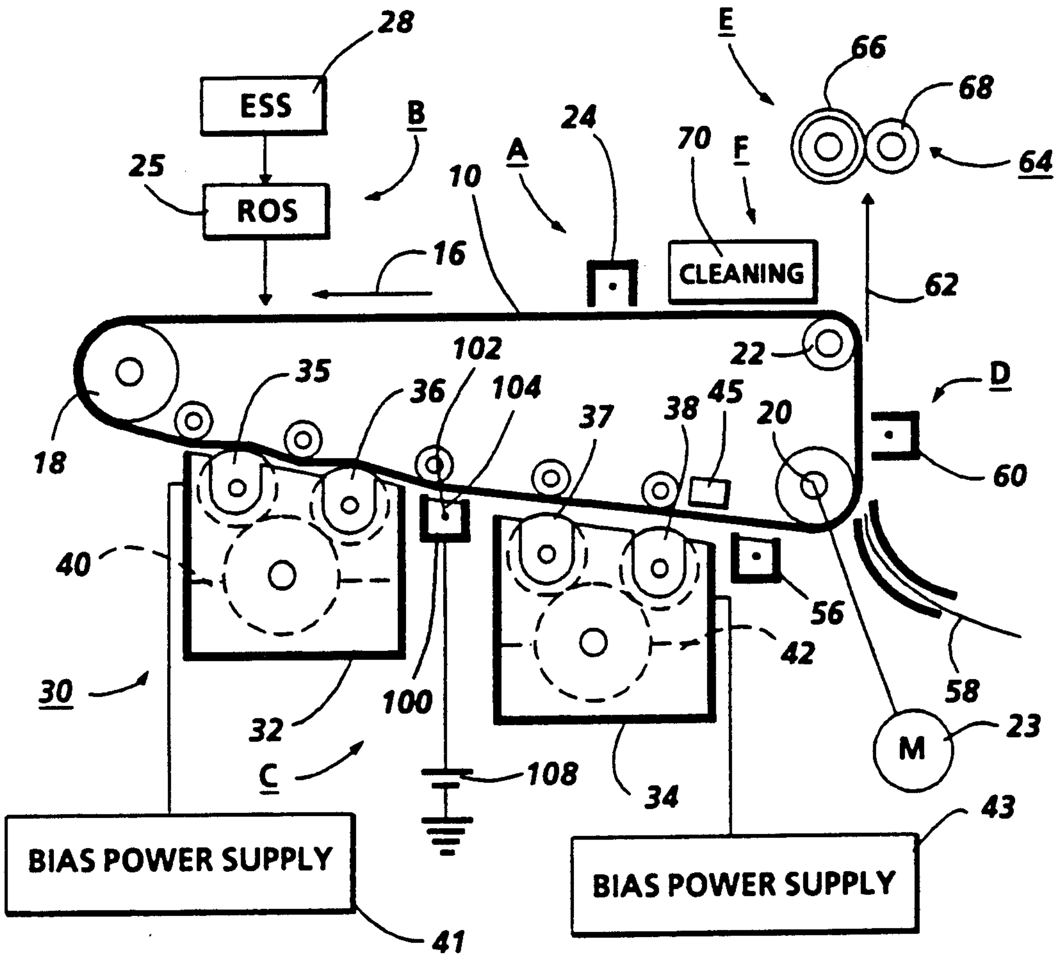
FIG. 2 is schematic illustration of a printing apparatus incorporating the inventive features of our invention.

As shown in FIG. 2, a printing machine incorporating our invention may utilize a charge retentive member in the form of a photoconductive or photoreceptor belt 10 consisting of a photoconductive surface and an electrically conductive substrate mounted for movement past a charging station A, an exposure B, developer stations C, transfer station D and cleaning station F. Belt 10 moves in the direction of arrow 16 to advance successive portions thereof sequentially through the various processing stations disposed about the path of movement thereof. Belt 10 is entrained about a plurality of rollers 18, 20 and 22, the former of which can be used as a drive roller and the latter of which can be used to provide suitable tensioning of the photoreceptor belt 10. Motor 23 rotates roller 18 to advance belt 10 in the direction of arrow 16. Roller 18 is coupled to motor 23 by suitable means such as a belt drive.

As can be seen by further reference to FIG. 2, initially successive portions of belt 10 pass through charging station A. At charging station A, a corona discharge device such as a scorotron, corotron or dicorotron indicated generally by the reference numeral 24, charges the belt 10 to a selectively high uniform positive or negative potential, $V_O$. Preferably charging is negative. Any suitable control, well known in the art, may be employed for controlling the corona discharge device 24.

Next, the charged portions of the photoreceptor surface are advanced through exposure station B. At exposure station B, the uniformly charged photoreceptor or charge retentive surface 10 is exposed by a laser based or other output scanning device 25 which causes the charge retentive surface to be discharged in accordance with the output from the scanning device. Preferably the scanning device is a three level laser Raster Output Scanner (ROS). Alternatively, the ROS could be replaced by a conventional xerographic exposure device. The ROS is operated under the control of an Electronic Subsystem ESS 28.

The photoreceptor, which is initially charged to a voltage $V_O$, undergoes dark decay to a level $V_{ddp}$. When exposed at the exposure station B it is discharged to $V_w$ imagewise in the background (white) image areas, to $V_{CAD}$ which is at or near $V_{ddp}$ in the black area and to $V_{DAD}$ which is near zero or ground potential in the highlight (i.e. color other than black) color parts of the image. See FIG. 1*a*.

At development station C, a magnetic brush development system, indicated generally by the reference numeral 30 moves developer materials into contact with the electrostatic latent images. The development system 30 comprises first and second developer housings 32 and 34. By way of example, each magnetic brush development housing includes a pair of magnetic brush developer rollers. Thus, the housing 32 contains a pair of rollers 35, 36 while the housing 34 contains a pair of magnetic brush rollers 37, 38. Each pair of rollers advances its respective developer material into contact with the latent image. Appropriate developer biasing is accomplished via power supplies 41 and 43 electrically connected to respective developer housings 32 and 34.

Color discrimination in the development of the electrostatic latent image is achieved by passing the photoreceptor past the two developer housings 32 and 34 in a single pass with the magnetic brush rolls 35, 36, 37 and 38 electrically biased to voltages which are offset from the background voltage $V_w$, the direction of offset depending on the polarity of toner in the housing. The housing 32 contains developer with negative red toner 40 having triboelectric properties such that the toner is driven to the parts of the latent image at residual potential, $V_{DAD}$ by the electrostatic field between the photoreceptor and the development rolls 35 and 36 biased at $V_{cb}$ ($V_{color\ bias}$) as shown in FIG. 1*b*. Conversely, the triboelectric charge on the positive black toner in the second housing 34 is chosen so that the toner is urged towards parts of the latent image which are the most highly charged ($V_{CAD}$) areas of the latent image by the electrostatic field existing between the photoreceptor and the development rolls the second housing at bias voltage $V_{bb}$ ($V_{black\ bias}$).

A sheet of support material 58 is moved into contact with the toner image at transfer station D. The sheet of support material is advanced to transfer station D by conventional sheet feeding apparatus, not shown. Preferably, sheet feeding apparatus includes a feed roll contacting the uppermost sheet of a stack of copy sheets. Feed rolls rotate so as to advance the uppermost sheet from stack into a chute which directs the advancing sheet of support material into contact with photoconductive surface of belt 10 in a timed sequence so that the toner powder image developed thereon contacts the advancing sheet of support material at transfer station D.

Because the composite image developed on the photoreceptor consists of both positive and negative toner, a pre-transfer corona discharge member 56 is provided to condition the toner for effective transfer to a substrate using corona discharge.

Transfer station D includes a corona generating device 60 which sprays ions of a suitable polarity onto the backside of sheet 58. This attracts the charged toner powder images from the belt 10 to sheet 58. After transfer, the sheet continues to move, in the direction of arrow 62, onto a conveyor (not shown) which advances the sheet to fusing station E.

Fusing station E includes a fuser assembly, indicated generally by the reference numeral 64, which permanently affixes the transferred powder image to sheet 58. Preferably, fuser assembly 64 comprises a heated fuser roller 66 and a backup roller 68. Sheet 58 passes between fuser roller 66 and backup roller 68 with the toner powder image contacting fuser roller 66. In this manner, the toner powder image is permanently affixed to sheet 58. After fusing, a chute, not shown, guides the advancing sheet 58 to a catch tray, also not shown, for subsequent removal from the printing machine by the operator.

After the sheet of support material is separated from photoconductive surface of belt 10, the residual toner particles carried by the non-image areas on the photoconductive surface are removed therefrom. These particles are removed at cleaning station F.

Subsequent to cleaning, a discharge lamp (not shown) floods the photoconductive surface with light to dissipate any residual electrostatic charge remaining prior to the charging thereof for the successive imaging cycle.

The magnetic brush rolls 35 and 36 may comprise any conventional structures known in the art that provide a magnetic field that forms the developer material in the housing 32 into a brush-like configuration in the development zone between the rolls 35 and 36 and the charge retentive surface. This arrangement effects development of one of the two image areas contained on the charge retentive surface in a well known manner.

The magnetic brush rolls 37 and 38 on the other hand are constructed such that development of the other of the two image areas is accomplished with minimal disturbance of the first image. The magnetic brush rolls 37 and 38 may be of the type described in U.S. Pat. No. 4,833,504 granted to Parker et al on May 23, 1989.

Figure 3A:
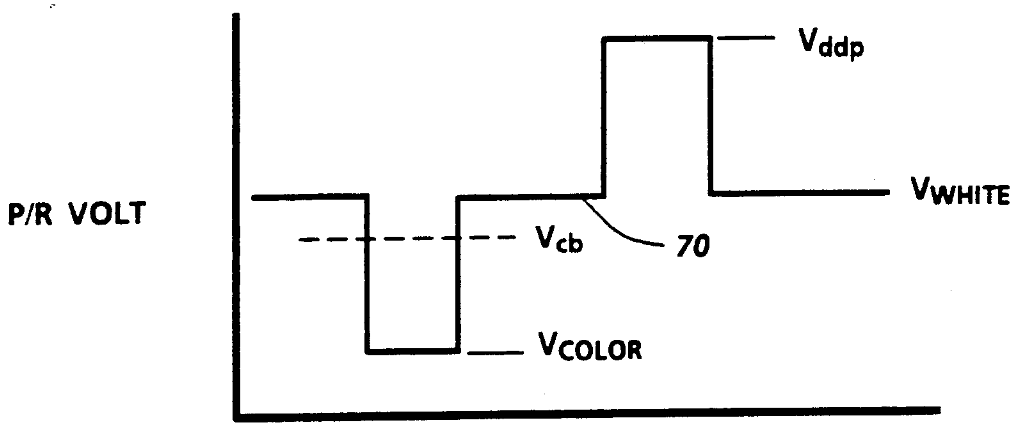
FIGS. 3*a* through 3*c* show respectively an undeveloped latent tri-level image, a tri-level image with the DAD image developed and a trivel-level image wherein the DAD image has been neutralized to the $V_{white}$ background voltage level.
Figure 3B:
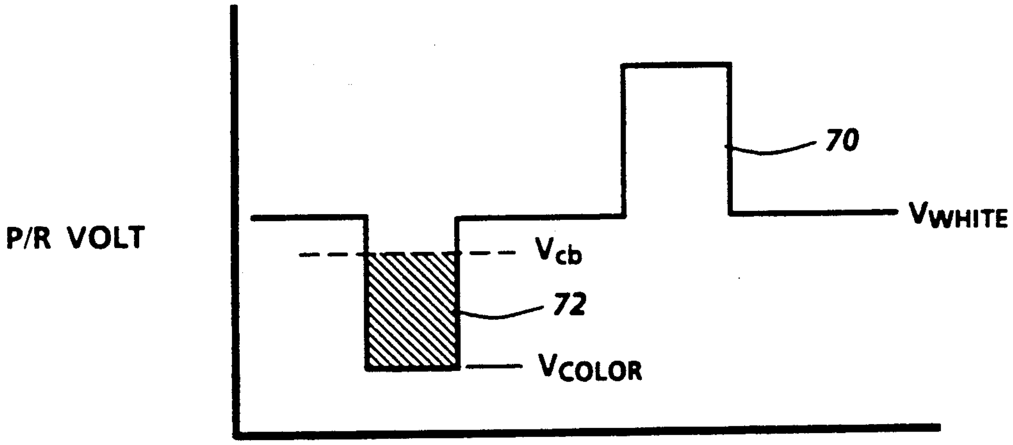
Figure 3C:
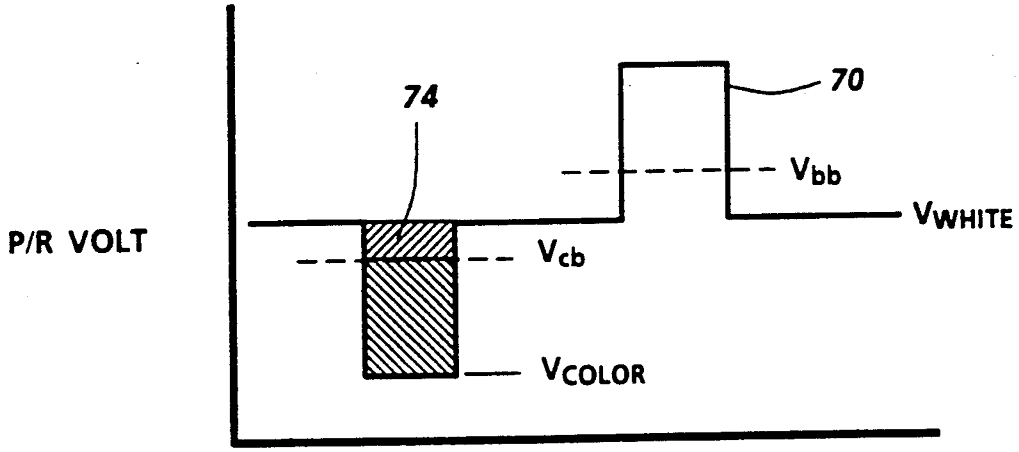

As shown in FIG. 3*a*, the ESS/ROS creates a composite tri-level latent image 70 on the photoreceptor in which the portions to be printed in color are the fully discharge while the black images to be printed with black toner remain at $V_{ddp}$, and the white (background) areas at an intermediate voltage, as illustrated in FIGURE. A DAD/CMB two component developer is used at the first development station to develop the colored parts of the latent image. The negative CMB developer is impervious to the fringe fields associated with the complimentary (in this case, black) latent image. In the process of developing the DAD image, the developer will raise the potential of the DAD image areas 72 to within a few volts of the first development housing's bias potential (Vcb in FIG. 3*b*). Thus, the magnitude of the fringe fields, due to the complementary tri-level image at the second development station, are diminished by the amount of charge neutralization that occurs in the first development step.

By providing a CAD/IMB two component developer having a conductivity in the order of $10^{-13}$ to $10^{-15}$ (ohm-cm)$^{-1}$ in the presence of the diminished charge level of DAD image due to charge neutralization, complementary fringe field development is precluded.

To enable the use of IMB developers with a conductivity less than $10^{-13}$ (ohm-cm)$^{-1}$, we have provided a corona discharge device in the form of a scorotron comprising a shield 100, one or more coronode wires 102 and a conductive grid 104. A suitable scorotron as disclosed in U.S. Pat. No. 4,591,713 comprises a corona generating electrode of short radius, an insulating and partially open shield partially housing the electrode, a source of electrical potential being operatively connected to the electrode to cause the electrode to emit a corona discharge, the coronode being separated from a screen by 4 to 5 mm. The screen is spaced about 1.5 to 2 mm away from the surface to be charged. Impedance to the electrode (coronode) is provided to prevent arcing. The resistance is selected to provide about a 10% drop in potential from the power supply to the electrode.

By placing this scorotron between the housings, and applying a DC bias to its grid 104 that is equal to $V_{WHITE}$, the toned residual $V_{DAD}$ image charge is moved to the $V_{WHITE}$ level without disturbing the undeveloped CAD portion of the latent image. With both $V_{WHITE}$ and the scorotron control grid at −400 volts, and the scorotron acting as a source of negative ions, the only time current flows through the control grid to the p/r is when regions that are less negative than −400 volts are present, namely the incompletely neutralized DAD image. Because $V_{WHITE}$ is equal to the control grid voltage, and $V_{CAD}$ is actually more negative, no current flows from the scorotron to these p/r regions.

What is claimed is:

1. Highlight color imaging apparatus including means for forming a single polarity charge pattern having at least three different voltage levels on a charge retentive surface wherein two of the voltage levels correspond to two image areas and the third voltage level corresponds to a background area, said apparatus comprising:
   - means including a first developer housing containing developer materials for forming a first contrasting image in one of said two image areas, said first developer housing containing conductive magnetic brush developer material; and
   - means including a second developer housing containing developer materials for forming a second contrasting image in the other of said two image areas, said second developer housing containing insulative magnetic brush material.

2. Apparatus according to claim 1 wherein said insulative magnetic brush material has a conductivity in the order of $10^{-13}$ to $10^{-15}$ (ohm-cm)$^{-1}$ whereby the development of spurious fringe fields of a complementary tri-level image are precluded.

3. Apparatus according to claim 2 wherein said one of said image areas is at a lower potential than the other of said two image areas.

4. Apparatus according to claim 3 wherein said the developer material in said first developer housing is colored and the developer material in said second developer housing is black.

5. Apparatus according to claim 4 wherein said colored developer is negative.

6. Apparatus according to claim 5 wherein said black developer has a positive charge.

7. Apparatus according to claim 1 including a corona discharge device disposed between said developer housings for neutralizing the charge on said first contrasting image to approximately the level of said background area and wherein the conductivity of said insulative magnetic brush material is less than $10^{-13}$ (ohm-cm)$^{-1}$.

8. The method of creating tri-level images including the steps of:

forming a single polarity charge pattern having at least three different voltage levels on a charge retentive surface wherein two of the voltage levels correspond to two image areas and the third voltage level corresponds to a background area, said apparatus comprising:

using a first developer housing containing conductive magnetic brush developer material, forming a first contrasting image in one of said two image area; and using a second developer housing containing insulative magnetic brush material, forming a second contrasting image in the other of said two image areas.

9. The method according to claim 8 wherein the step of forming a second contrasting image is effected using an insulative magnetic brush material having a conductivity in the order of $10^{-13}$ to $10^{-15}$ (ohm-cm)$^{-1}$ whereby the development of spurious fringe fields of a complementary tri-level image are precluded.

10. The method according to claim 9 wherein said one of said image areas is at a lower potential than the other of said two image areas.

11. The method according to claim 10 wherein said the developer material in said first developer housing is colored and the developer material in said second developer housing is black.

12. The method according to claim 11 wherein said colored developer is negative.

13. The method according to claim 14 wherein said black developer has a positive charge.

14. The method according to claim 8 including the step of using a corona discharge device subsequent to said first contrasting image formation for neutralizing the charge on said first contrasting image to approximately the level of said background area wherein the step of forming a second contrasting image is effected using an insulative magnetic brush material having a conductivity less than $10^{-13}$ (ohm-cm)$^{-1}$ whereby the development of spurious fringe fields of a complementary tri-level image are precluded.

* * * * *